Figure 1:
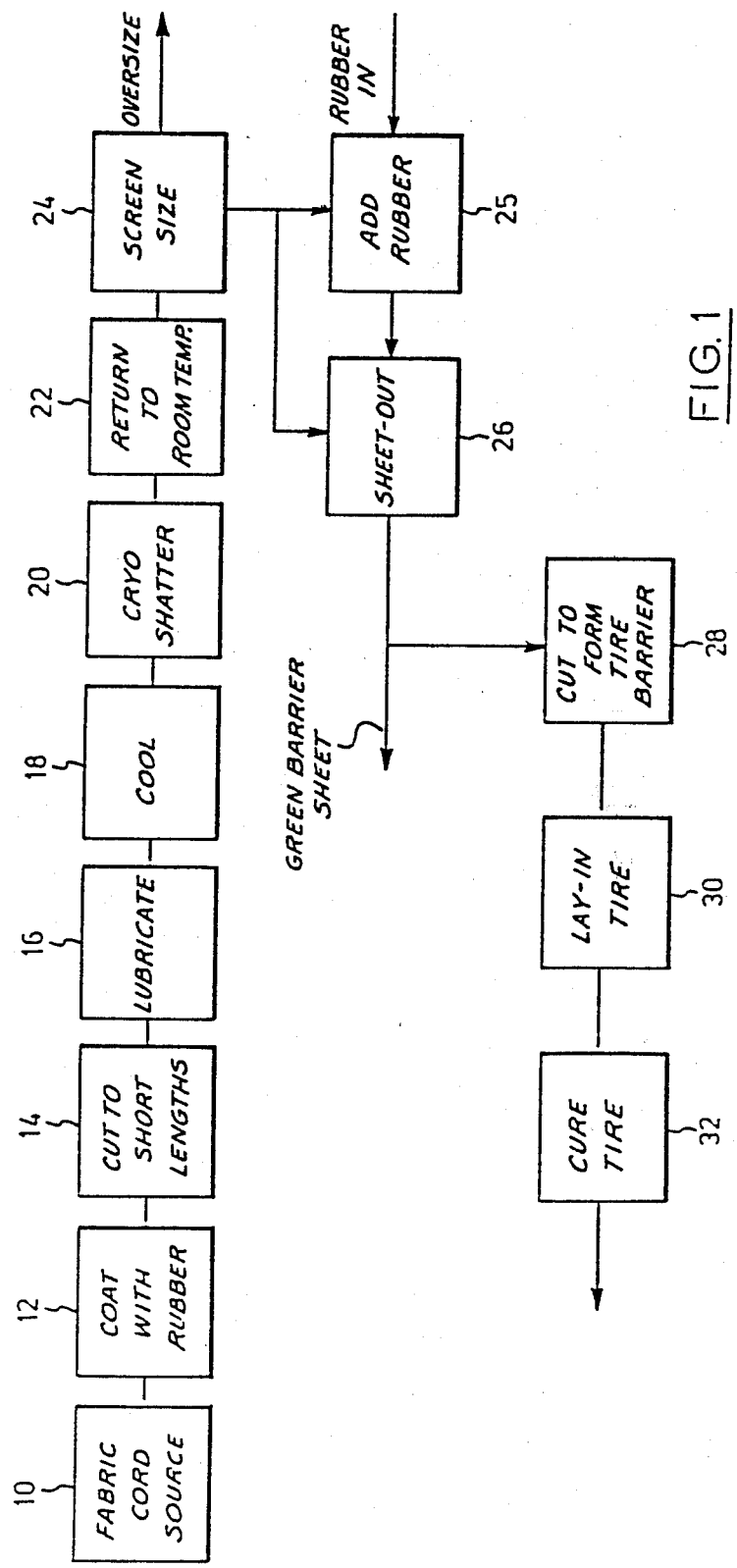

United States Patent [19]

Shackleton

[11] 4,383,876
[45] May 17, 1983

[54] BARRIER SHEET AND METHOD OF MANUFACTURING SAME

[75] Inventor: John S. Shackleton, Baltimore, Canada

[73] Assignee: United Tire and Rubber Co. Limited, Rexdale, Canada

[21] Appl. No.: 295,323

[22] Filed: Aug. 24, 1981

Related U.S. Application Data

[63] Continuation-in-part of Ser. No. 273,000, Jun. 12, 1981, abandoned.

[51] Int. Cl.³ .......................... B29D 3/02; B60C 9/18; B02C 11/08
[52] U.S. Cl. ................. 156/110 R; 152/348; 152/374; 241/23; 241/DIG. 37; 264/28; 264/108; 264/140; 428/113; 428/375; 428/339; 428/911
[58] Field of Search ................ 264/28, 108, 140, 143, 264/138, 37; 241/23, DIG. 30, 32, 37; 62/320, 321; 19/0.3, 0.46; 156/123 R, 110 R; 152/374, 348; 428/113, 109, 107, 297, 903, 907, 911, 339, 323

[56] References Cited

U.S. PATENT DOCUMENTS

| | | | |
|---|---|---|---|
| 1,742,777 | 1/1930 | Midgley | 156/170 |
| 2,209,509 | 7/1940 | Carr | 264/28 |
| 3,042,570 | 7/1962 | Bradt | 264/174 |
| 3,718,448 | 2/1973 | Drummond et al. | 65/3.43 |
| 3,751,767 | 8/1973 | Marshall | 264/28 |
| 3,921,874 | 11/1975 | Spain | 264/143 |
| 4,025,990 | 5/1977 | Lovette, Jr. | 241/23 |
| 4,124,997 | 11/1978 | Sadjina | 62/320 |
| 4,257,468 | 3/1981 | Ogawa et al. | 152/374 |
| 4,273,294 | 1/1981 | Hollely | 241/23 |

*Primary Examiner*—Michael W. Ball
*Attorney, Agent, or Firm*—Fetherstonhaugh & Co.

[57] ABSTRACT

A barrier sheet suitable for use in the manufacture of cured rubber products, such as tires, belts or the like, is produced by a method which includes the steps of coating elongated reinforcement cords with uncured rubber, cutting the coated reinforcement cords to form short lengths, lubricating the short lengths to prevent balling and sheeting-out the fine particles to form a sheet of green barrier material. The barrier sheet formed by this method may be laid in to a tire during a tire building operation to form a tire reinforcement.

16 Claims, 1 Drawing Figure

BARRIER SHEET AND METHOD OF MANUFACTURING SAME

RELATED APPLICATION

This application is a continuation-in-part of application Ser. No. 273,000 filed June 12, 1981 and now abandoned.

This invention relates to a method of forming a barrier sheet suitable for use in the manufacture of cured rubber products, such as tires, belts or the like.

PRIOR ART

Considerable difficulty has been experienced in attempting to provide a barrier for use in cured rubber products because of difficulties which have been experienced in obtaining the required resistance to penetration and sufficient adhesion between the barrier and the rubber product in which it is employed. For this reason, many of the barrier sheets presently employed are formed from longitudinally elongated fabric cords which are arranged in one or more layers of parallel cords embedded in a rubber matrix. Barrier sheets of this type when used in the manufacture of tires are subject to failure through "cord separation" because small penetrants, such as nails, etc., are able to push the cords aside and meet resistance to penetration from the rubber alone.

In previous proposals in which short lengths of fibre have been mixed with rubber prior to sheeting-out to form a barrier sheet, considerable difficulty has been experienced in obtaining a homogeneous distribution of the fabric particles throughout the rubber. The fabric particles tend to gather together in local areas of high concentration.

A homogeneous distribution of the fabric is, however, necessary in order to provide an effective barrier sheet for use as an impact and cut resistant barrier of a tire or the like.

It has been found that a barrier sheet having a homogeneous mixture of fabric and rubber can be made with ease if the fabric cords are initially coated with an uncured rubber and the coated cords are cut to short lengths, and thereafter formed to provide a sheet.

SUMMARY OF INVENTION

According to a further aspect of the present invention, there is provided a method of forming a barrier sheet suitable for use in the manufacture of cured rubber products, such as tires, belts and the like comprising the steps of: coating elongated reinforcement cords with uncured rubber, cutting the coated reinforcement cords into short lengths suitable for subsequent cryogenic shattering, lubricating the short lengths to prevent balling thereof, cooling the short lengths to a temperature suitable to permit cryogenic shattering, shattering the cooled short lengths to form fine particles, permitting the fine particles to return to a temperature suitable for sheeting-out, and sheeting-out the fine particles to form a sheet of green barrier material.

According to yet another aspect of the present invention, there is provided a method of manufacturing a tire comprising the steps of manufacturing a green barrier sheet in the manner described in the preceeding paragraph and, thereafter, cutting the green barrier sheet to form a tire barrier sheet, laying-in said tire barrier sheet in a tire during construction of a tire and curing the tire thus formed to bond the tire barrier sheet in place within the tire.

The invention will be more clearly understood after reference to the following detailed specification read in conjunction with the drawings wherein FIG. 1 is a diagrammatic illustration of the various steps in a method according to an embodiment of the present invention.

Reinforcement fibre cords, such as cotton, FIBERGLAS (Trade Mark), nylon, rayon, KEVLAR (Trade Mark) are commonly used to reinforce rubber products, such as tires and power transmission belts and any one of these cords may form the cord source identified by the reference numeral 10 in FIG. 1.

In the method illustrated in FIG. 1 of the present invention, the reinforcing fibre cord is unwound into a coating station 12 in which it is coated with green or uncured rubber in a process, such as a calendering process to form a sheet measuring 55" wide and having a thickness of the order of about 0.018" to 0.060". The sheets are then plied to form a multiply sheet having a thickness of about 0.25". It will be understood that the uncured rubber may be natural or synthetic rubber or a blend of natural and synthetic rubber. The rubber coated cords are, then, conveyed to a cutting station 14 in which they are cut or chopped to short lengths, generally in the form of 0.25". cubes. The size of these short lengths is determined by the characteristics of the reinforcing cord and the rubber coating so that the short lengths are suitable for subsequent cryogenic shattering, with the result that the size may vary quite substantially. The short lengths are, then, lubricated in a lubricating station 16 with a lubricant, such as stearic acid or zinc stearate dust to provide a surface lubricant which serve to prevent balling-up which can result from the uncured rubber sticking to itself. The lubricated short lengths are, then, cryogenically cooled in a cooling station 18 by means of liquid nitrogen to a temperature of about −320° F. which is sufficient to permit the material from which the short lengths are made to be shattered. The cryogenically cooled particles are, then, shattered in a hammer mill or the like in the station identified by the reference numeral 20.

Preferably the shattering reduces the particle size to that which will pass through a standard 40-mesh screen. The particles are held in the station 22 until the temperature of the particles returns to room temperature. The particles are, then, screened in a screening station 24 so that oversize particles are removed and particles of the required size are obtained. The required size particles may, then, be transferred directly to a sheeting-out station 26 in which they are calendered to form a green barrier sheet. Alternatively, additional rubber may be added to reduce the fabric concentration in a rubber adding station 25. Rubber may be added by milling the fine particles which are withdrawn from the screening station 24 with additional rubber.

In the initial rubber-coating station 12, the reinforcing cords may be coated with a sufficient amount of rubber to provide a rubber-to-reinforcement cord content by volume of the order of 5% to 50%.

It is desirable to avoid the addition of an excessive amount of rubber in this initial coating stage because the more rubber which is employed, the greater the amount of coolant required to cryogenically cool the coated short lengths. Rubber may be added at the station 25 to increase the ratio of rubber-to-cord to that required for the end product.

It has been found that the rubber-coated short lengths can be uniformly mixed in the rubber adding station without the difficulties previously experienced in attempting to mix uncoated reinforcing cord in rubber. The rubber-coated short lengths can be dispersed evenly throughout the rubber matrix to provide a homogeneous mixture of cores and rubber prior to sheeting-out.

After sheeting-out in station 26, a green or uncured barrier sheet is formed. This sheet may, then, be used as a barrier sheet in the production of any rubber product which is subsequently cured, such as a tire, power transmission belt or the like.

After sheeting-out, a number of sheets may be laid one on top of another to form a composite sheet of any required gauge having a number of plies. By reason of the longitudinal alignment of the short lengths in the direction of the longitudinal extent of the sheet produced in the sheeting-out process, a multiply barrier sheet may be formed with the particles oriented in different directions from one ply to the next ply or all the plies may be arranged so that the particles are aligned in the same direction.

After sheeting-out, and if necessary plying, the sheets are cut to form a tire barrier in a cutting station 28. The sheets may, then, be cut to form an undertread protector, sidewall protector, chaffer, a radial barrier sheet, a bias-ply barrier sheet or the like. The barrier sheets are, then, layed-in to a tire in a conventional tire building stage 30 and, thereafter, the tire is cured in a conventional tire cutting station 32.

In previous attempts to add fabric to rubber compositions, the adhesion characteristics of the end product has been so poor as to render the product unsatisfactory. Conventional rubber-to-rubber adhesion is generally of the order of about 20 kg/cm and when significant quantities of fabric fibre are added to rubber in previous processes, the adhesion has dropped to the order of about 0.1 kg/cm which is substantially less than the acceptable level which is generally taken to be about 12 kg/cm. Tests have shown that the adhesion characteristics of the barrier sheet produced according to the method of the present invention is such that the end product has an adhesion characteristic of about 16 kg/cm. In tear propagation tests, rubber which contained no fabric reinforcement gave a reading of 220 kNm and in the same test and the same rubber, reinforced according to the present invention, a reading of 212 kNm was obtained. In conventional plunger energy tests, rubber which contains no fabric reinforcement tested out at 120 lbs/in thickness whereas the barrier sheet of the present invention formed from the same rubber has tested at 892 lbs/in thickness. Thus, it will be seen that with only a very slight reduction in adhesion and tear propagation characteristics, the barrier sheet of the present invention provides a very substantial increase in plunger energy resistance and is, therefore, well suited as a barrier sheet in tires, belts and hoses.

When a barrier sheet constructed in accordance with the present invention is used in a bias-ply tire, the green barrier sheet may be cut in the cutting station 28, at an angle to its longitudinal direction so that when layed-in to a tire, the longitudinal alignment of the particles may extend in the direction of the bias. Similarly, when the barrier sheet is to be used as a radial barrier sheet, the sheet is cut and the longitudinally aligned particles are aligned with the radial extent of the barrier sheet.

The apparatus for use in the process of the present invention preferably includes calendering means in the rubber-coating station 12 and a knife or guillotine device in the cutting station 14. In the lubricating station, the lubricant is shaken onto the short lengths in a conventional manner.

A cryogenically cooling device is provided in the cooling station 18. Shattering in the shattering station 20 is carried out by means of a hammermill and conventional mesh screens are used in the screening station 24. When rubber is added in the station 28, a mill is employed and during sheeting-out, a calendering device is employed in the sheeting-out station 26. It will be noted that, with the exception of the cryogenic cooling device, all of the apparatus required to carry out the method of the present invention is in everyday use in the rubber fabricating industry. A suitable cryogenic cooling unit is manufactured by Air Products Inc.

From the foregoing, it will be apparent that the present invention provides a simple and inexpensive method of forming a barrier sheet suitable for use in the manufacture of cured rubber products, such as tires or the like.

What I claim as my invention is:

1. A method of forming a barrier sheet suitable for use in the manufacture of cured rubber products, such as tires, belts and the like comprising the steps of:
   (a) coating elongated reinforcement cords with uncured rubber;
   (b) cutting the coated reinforcement cords to form short lengths suitable for subsequent cryogenic shattering;
   (c) lubricating the short lengths to prevent balling thereof;
   (d) cooling the short lengths to a temperature suitable to permit cryogenic shattering;
   (e) shattering the cooled short lengths to form fine particles;
   (f) permitting the fine particles to return to a temperature suitable for sheeting-out;
   (g) sheeting-out the fine particles to form a sheet of green barrier material.

2. A method as claimed in claim 1 wherein additional green rubber is added after shattering and prior to sheeting-out whereby the rubber content of the green barrier sheet is substantially greater than that of the coated short lengths, thereby avoiding the need to cool excessive amounts of rubber prior to shattering.

3. A method as claimed in claim 1 wherein the coating of the elongated reinforcement cords with rubber is carried out by calendering.

4. A method as claimed in claim 1 wherein the rubber content of the coated reinforcement cords is in the range of 20% to 95% by volume.

5. A method as claimed in claim 1 wherein after calendering to form thin sheets of coated reinforcement cords, the thin sheets are plied to form a multiply sheet prior to cutting to form short lengths.

6. A method as claimed in claim 1 wherein the short lengths are cooled by liquid nitrogen to a temperature of the order of about $-320°$ F.

7. A method as claimed in claim 1 wherein said uncured rubber is natural rubber.

8. A method as claimed in claim 1 wherein said uncured rubber is synthetic rubber.

9. A method as claimed in claim 1 wherein said sheeting-out is carried out by means of a calendering process such that a substantial proportion of the fine particles are longitudinally aligned with one another in the direction of the longitudinal extent of the green barrier sheet.

10. A method as claimed in claim 9 wherein the sheet of green barrier material is cut an at angle to said longitudinal direction to form a bias-ply tire barrier sheet.

11. A method as claimed in claim 9 wherein the sheet of green barrier material is cut in the direction parallel to the longitudinal extent of the sheet to form a radial barrier sheet for a radial tire.

12. A method as claimed in claim 1 wherein a plurality of sheets are laminated after sheeting out whereby the green barrier sheet is a multiply sheet.

13. In a method of manufacturing a tire the improvement wherein a green barrier sheet is formed by coating elongated fibre cords with uncured rubber, cutting the coated rubber cords into short lengths suitable for subsequent cryogenic shattering, lubricating the short lengths to prevent balling, cryogenically shattering the cooled short lengths to form a fine particulate material, permitting the fine particle material to return to a temperature suitable for sheeting-out, sheeting-out the fine particle material to form a sheet of green barrier material, cutting said sheet of green barrier material to form a tire barrier sheet, laying-in said tire barrier sheet in a tire during construction of a tire and curing the tire thus formed to bond the tire barrier sheet in place within the tire.

14. A method of manufacturing a tire as claimed in claim 13 wherein the tire is a bias-ply tire and the green barrier sheet is cut at an angle to its longitudinal direction to form a bias-ply barrier sheet prior to laying-in in the tire.

15. A method of manufacturing a tire as claimed in claim 13 wherein the green barrier sheet is cut in a direction parallel to the longitudinal extent of the sheet to form a radial barrier sheet prior to laying-in in the tire.

16. A method as claimed in claim 1 wherein the uncured rubber is a blend of natural and synthetic rubber.

* * * * *